L. COBB & F. PITMAN.
DUST CAP.
APPLICATION FILED FEB. 18, 1915.
1,151,085.
Patented Aug. 24, 1915.
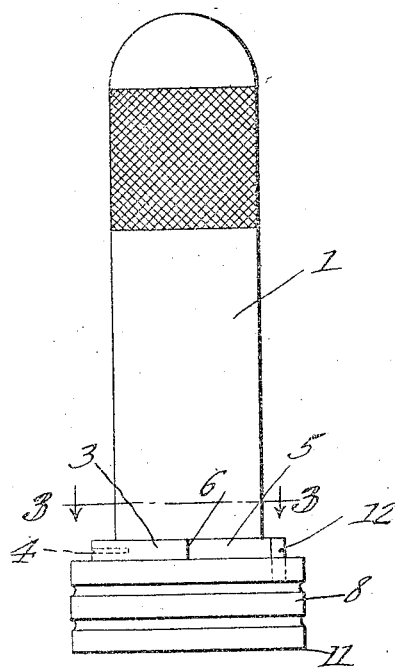
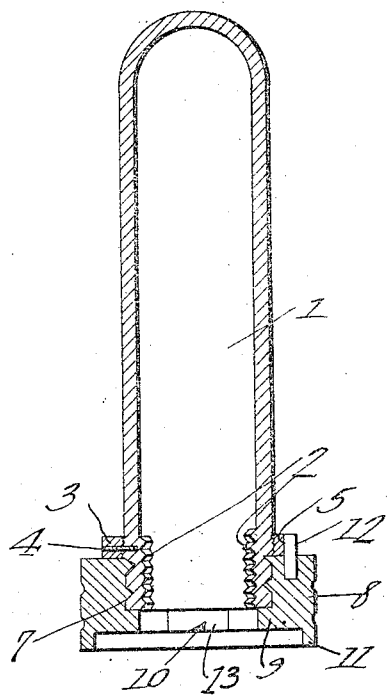
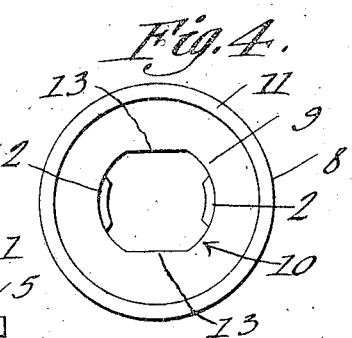
Witnesses
L. Cobb AND
F. Pitman
Inventors
by _____
Attorneys

UNITED STATES PATENT OFFICE.

LUTHER COBB AND FARRIS PITMAN, OF BEDFORD, INDIANA.

DUST-CAP.

1,151,085.

Specification of Letters Patent.

Patented Aug. 24, 1915.

Application filed February 18, 1915. Serial No. 9,108.

*To all whom it may concern:*

Be it known that we, LUTHER COBB and FARRIS PITMAN, citizens of the United States, residing at Bedford, in the county of Lawrence, State of Indiana, have invented a new and useful Dust-Cap, of which the following is a specification.

The present invention appertains to a dust cap for tire valve stems, and aims to provide a novel and improved dust cap which may be quickly applied to and detached from the valve stem, and which when applied thereto will bind or lock itself in position thereon, so that the cap cannot become accidentally loosened or detached due to the vibration of the wheel.

It is also within the scope of the invention to provide a dust cap having the features above noted, and which is of comparatively simple, compact, non-encumbering and inexpensive construction, as well as being convenient, efficient and thoroughly practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the improved dust cap. Fig. 2 is a central longitudinal section thereof. Fig. 3 is a cross sectional view taken on the line 3—3 of Fig. 1. Fig. 4 is a bottom view of the cap. Fig. 5 is a fragmental elevation of a portion of the cap.

In carrying out the invention, there is employed a cap proper 1, which is provided at its mouth or lower end portion, with interior mutilated screw threads, and the interior of the cap is otherwise smooth. The mutilated screw threads embody the diametrically opposite threaded portions 2 adjacent the lower end or mouth of the cap. The threaded portions 2 are designed to slide along the flattened sides of the tire valve stem, in order that the cap 1 may be readily slid onto and off of the valve stem when the cap 1 is rotated so that the threaded portions 2 lie adjacent the flat sides of the valve stem.

A collar 3 is threaded upon the cap 1 adjacent its lower end, and is preferably secured in place by means of a set screw or securing element 4, to prevent accidental loosening or displacement of the collar 3. The collar 3 is provided with an arcuate recess 5 providing a stop 6 at one end thereof. The cap 1 is provided with an exterior screw thread 7 below the collar 3 or between the said collar and the lower end of the cap, and the screw thread 7 is of relatively large pitch or is a "quick" thread.

A ring or circular nut 8 is carried by the lower end of the cap 1, the ring or nut 8 being engaged to the quick thread 7 of the cap, so as to be rotatable upon the lower end of the cap, and to move to and from the collar 3 as the ring or nut 8 is rotated. The ring or nut 8 is provided with an internal inwardly projecting annular flange 9 adjacent the lower face of the ring or nut 8, and which is adapted to bear or abut against the lower end of the cap 1 when the ring or nut 8 is screwed upwardly upon the cap 1 to the limit. The flange 9 provides a restricted opening 10, and the ring or nut 8 is provided with a depending marginal or peripheral annular lip 11 depending below the flange 9, and adapted to surround the washer which is threaded upon the valve stem at the base thereof.

A pin 12 is engaged into the upper face of the ring or nut 8 and is adapted to work within the recess or cut away portion 5 of the collar 3. The restricted opening or aperture 10 of the ring or nut 8 is of non-circular contour, and has the flat sides 13 which are adapted to slidably engage the flat sides of the valve stem, whereby the ring or nut 8 is adapted to slide upon the valve stem, and is constrained against rotatory movement upon the stem. The parts are so arranged, that when the cap and nut are rotated relative to one another to bring the pin 12 against the stop 6, the flat sides 13 of the opening 9 will lie flush or in alinement with the threaded portions 2 of the cap 1, so that the cap and nut may be slid onto and off of the valve stem without interference.

In use, to apply the cap to a valve stem, the nut 8 is rotated to bring the pin 12 thereof against the stop 6, in which event the cap may be readily slid over the valve stem to bring the nut 8 against the washer upon the stem, which will limit the downward movement of the cap upon the valve stem. Then, by giving the cap 1 a right hand turn, the threaded portions 2 being right handed, as well as the interengaging screw threads of the cap and nut 8, the threaded portions 2 of the cap will be swung into engagement with the threads of the valve stem, but the nut 8 will be restrained in a non-rotatable position, and as a result, the stop 6 of the collar 3 will be moved away from the pin 12 of the nut, and the cap 1 will screw downwardly into the nut 8, which will cause the nut and cap to bind tightly together. This will lock or bind the cap upon the valve stem, and whereby the cap cannot become accidentally loosened or detached notwithstanding the severe vibrations to which the wheel is subjected. This binding action may be accomplished either by the contact of the nut 8 and collar 3, or the contact of the lower end of the cap 1 and flange 9 of the nut. To remove the cap, it is only necessary to give the cap 1 a partial turn so as to bring the stop 6 of the collar 3 against the pin 12, in which event the cap and nut may be readily slid off of the valve stem.

The advantages and attributes of the present dust cap will no doubt be obvious from the foregoing taken in connection with the drawing without further comment being necessary.

Having thus described the invention, what is claimed as new is:

In a device of the character described, a cap having inner mutilated screw threads, a collar thereon adjacent its lower end, and external screw threads between the said collar and lower end of the cap, the collar having an arcuate recess providing a stop at one end thereof, and a nut engaging the screw threads of the cap and having an inwardly projecting annular flange below the lower end of the cap and providing a restricted non-circular opening, whereby the nut is slidable and non-rotatable upon a valve stem, the nut having a pin working within the said recess of the collar and adapted to contact with the said stop, and the mutilated screw threads of the cap being such that when the pin and stop are in contact, the cap is slidable upon the valve stem with the nut.

In testimony that we claim the foregoing as our own, we have hereto affixed our signatures in the presence of two witnesses.

LUTHER COBB.
FARRIS PITMAN.

Witnesses:
  JOHN H. UNDERWOOD,
  THOS. C. UNDERWOOD.